United States Patent
Goldberg

(10) Patent No.: US 8,438,917 B2
(45) Date of Patent: May 14, 2013

(54) METHODS OF LONG-TERM GRAVIMETRIC MONITORING OF CARBON DIOXIDE STORAGE IN GEOLOGICAL FORMATIONS

(75) Inventor: David S. Goldberg, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 564 days.

(21) Appl. No.: 12/677,823

(22) PCT Filed: Sep. 15, 2008

(86) PCT No.: PCT/US2008/076397
§ 371 (c)(1),
(2), (4) Date: Jul. 2, 2010

(87) PCT Pub. No.: WO2009/036420
PCT Pub. Date: Mar. 19, 2009

(65) Prior Publication Data
US 2011/0042074 A1    Feb. 24, 2011

Related U.S. Application Data

(60) Provisional application No. 60/972,081, filed on Sep. 13, 2007.

(51) Int. Cl.
*E21B 47/10* (2012.01)
*E21B 49/00* (2006.01)
*G01V 3/18* (2006.01)

(52) U.S. Cl.
USPC .................... 73/152.17; 73/382 G

(58) Field of Classification Search ............... 73/152.17, 73/382 G
See application file for complete search history.

(56) References Cited

U.S. PATENT DOCUMENTS

| | | | | |
|---|---|---|---|---|
| 3,777,814 A | * | 12/1973 | Gustavson et al. | 166/212 |
| 4,397,181 A | * | 8/1983 | Caldwell | 73/152.09 |
| 4,475,386 A | * | 10/1984 | Fitch et al. | 73/382 R |
| 4,625,547 A | * | 12/1986 | Lyle, Jr. | 73/152.05 |
| 4,733,725 A | * | 3/1988 | Pittaway et al. | 166/252.3 |
| 5,105,894 A | * | 4/1992 | Enderlin | 175/44 |
| 5,218,864 A | * | 6/1993 | Pennybaker | 73/152.05 |

(Continued)

OTHER PUBLICATIONS

International Search Report and the Written Opinion of the International Searching Authority, International Application No. PCT/US2008/076397, filed Sep. 15, 2008.

*Primary Examiner* — John Fitzgerald
(74) *Attorney, Agent, or Firm* — Wiggin and Dana LLP; Anthony P. Gangemi

(57) ABSTRACT

Methods for long-term gravimetric monitoring of carbon dioxide stored in a geological formation are disclosed. In some embodiments, the methods include the following: joining gravimetric sensors with sidewalls of boreholes in the geological formation at various vertical depths; using the gravimetric sensors, measuring a local gravitational field or a gravity gradient at a first time to develop baseline gravimetric data; reading and transmitting the baseline gravimetric data to a data recording device exterior to the boreholes; using the gravimetric sensors, measuring a local gravitational field or a gravity gradient after the first time to develop post-baseline gravimetric data; reading and; transmitting the post-baseline gravimetric data to the data recording device; and quantifying the carbon dioxide stored in the geological formation by comparing the baseline gravimetric data to the post-baseline gravimetric data to determine both vertical and horizontal positioning of the carbon dioxide stored in the geological formation.

20 Claims, 3 Drawing Sheets

U.S. PATENT DOCUMENTS

| | | | | |
|---|---|---|---|---|
| 5,302,782 | A * | 4/1994 | Owen | 181/122 |
| 5,448,912 | A * | 9/1995 | Black | 73/152.02 |
| 5,730,219 | A * | 3/1998 | Tubel et al. | 166/250.1 |
| 5,886,255 | A * | 3/1999 | Aronstam | 73/152.01 |
| 5,970,787 | A | 10/1999 | Wignall | |
| 6,302,204 | B1 * | 10/2001 | Reimers et al. | 166/250.03 |
| 6,467,341 | B1 * | 10/2002 | Boucher et al. | 73/152.43 |
| 7,047,170 | B2 | 5/2006 | Feldman et al. | |
| 7,707,883 | B2 * | 5/2010 | DiFoggio | 73/382 R |
| 7,793,543 | B2 * | 9/2010 | Csutak | 73/514.27 |
| 8,113,041 | B2 * | 2/2012 | Difoggio et al. | 73/152.05 |
| 2003/0094282 | A1 * | 5/2003 | Goode et al. | 166/255.2 |
| 2003/0098799 | A1 | 5/2003 | Zimmerman | |
| 2008/0271533 | A1 * | 11/2008 | Csutak | 73/514.27 |
| 2009/0044618 | A1 * | 2/2009 | DiFoggio et al. | 73/152.59 |

* cited by examiner

METHODS OF LONG-TERM GRAVIMETRIC MONITORING OF CARBON DIOXIDE STORAGE IN GEOLOGICAL FORMATIONS

CROSS REFERENCE TO RELATED APPLICATION(S)

This application claims the benefit of U.S. Provisional Application No. 60/972,081 filed Sep. 13, 2007, which is incorporated by reference as if disclosed herein in its entirety.

BACKGROUND

Generally, carbon dioxide storage and sequestration projects require long term, but cost-effective monitoring, measuring, and verification (MMV) protocols for the duration of the combined injection and monitoring periods to be successful. MMV requires instrumentation and experimentation spanning several operational years and possibly decades. Few in situ instruments are capable of sustained multi-year deployments in such hostile subsurface environments. As a result, appropriate sensors for high resolution monitoring of carbon dioxide movement and resulting changes within the reservoir remain undeveloped.

In the oil and gas industry, the practice of temporarily lowering gravimetric sensors into boreholes to measure the rock and fluid properties of a geologic formation is well-known and referred to as well logging or borehole logging. However, as mentioned, well logging does not provide for long term monitoring, is temporary, and will fail to detect small conditional changes in a plume of carbon dioxide unless the well logging is performed at the proper time and proper depth. To ensure proper detection of carbon dioxide, well logging would have to be performed almost continuously.

Other methods are known that call for taking gravimetric measurements at the surface of a geographical formation and then creating a model to project vertically and predict the subsurface conditions. No known methods include taking subsurface gravimetric measurements and using them to project inter-sensor lateral and vertical movements of subsurface plumes.

SUMMARY

Methods for long-term gravimetric monitoring of carbon dioxide stored in a geological formation are disclosed. In some embodiments, the methods include the following: joining gravimetric sensors with sidewalls of boreholes in the geological formation at various vertical depths of the boreholes; using the gravimetric sensors, measuring a local gravitational field or a gravity gradient at a first time at each of the gravimetric sensors to develop baseline gravimetric data; reading the gravimetric sensors joined with the sidewalls to capture the baseline gravimetric data; transmitting the baseline gravimetric data to a data recording device exterior to the boreholes; using the gravimetric sensors, measuring a local gravitational field or a gravity gradient at each of the gravimetric sensors after the first time to develop post-baseline gravimetric data; reading the gravimetric sensors joined with the sidewalls to capture the post-baseline gravimetric data; transmitting the post-baseline gravimetric data to the data recording device exterior to the boreholes; and quantifying the carbon dioxide stored in the geological formation by comparing the baseline gravimetric data to the post-baseline gravimetric data to determine both vertical and horizontal positioning of the carbon dioxide stored in the geological formation.

Methods for long-term gravimetric monitoring of carbon dioxide stored in a geological formation are disclosed. In some embodiments, the methods include the following: joining gravimeters with sidewalls of boreholes in the geological formation at various vertical depths of the boreholes at a first time prior to injecting carbon dioxide into the geological formation, the gravimeters not being physically joined with any apparatus exterior to the boreholes after the gravimeters are joined with the sidewalls of the boreholes; using the gravimeters, measuring a local gravitational field at the first time at each of the gravimeters to develop baseline gravimetric data; reading the gravimeters joined with the sidewalls to capture the baseline gravimetric data; transmitting the baseline gravimetric data to a data recording device exterior to the boreholes; using the gravimeters, measuring a local gravitational field at each of the gravimeters at a second time after injecting a volume of carbon dioxide into the geological formation to develop post-baseline gravimetric data; reading the gravimeters joined with the sidewalls to capture the post-baseline gravimetric data; transmitting the post-baseline gravimetric data to the data recording device exterior to the boreholes; and quantifying the carbon dioxide stored in the geological formation by comparing the baseline gravimetric data to the post-baseline gravimetric data to determine both vertical and horizontal positioning of the carbon dioxide stored in the geological formation.

Methods for long-term gravimetric monitoring of carbon dioxide stored in a geological formation are disclosed. In some embodiments, the methods include the following: drilling boreholes in various locations of the geological formation; joining gravimeters with sidewalls of the boreholes in the geological formation at various vertical depths of the boreholes; using the gravimeters, measuring a local gravitational field at a first time at each of the gravimeters to develop baseline gravimetric data; reading the gravimeters joined with the sidewalls to capture the baseline gravimetric data; transmitting the baseline gravimetric data to a data recording device exterior to the boreholes; using the gravimeters, measuring a local gravitational field at each of the gravimeters after the first time to develop post-baseline gravimetric data; reading the gravimeters joined with the sidewalls to capture the post-baseline gravimetric data; transmitting the post-baseline gravimetric data to the data recording device exterior to the boreholes; and quantifying the carbon dioxide stored in the geological formation by comparing the baseline gravimetric data to the post-baseline gravimetric data to determine both vertical and horizontal positioning of the carbon dioxide stored in the geological formation.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
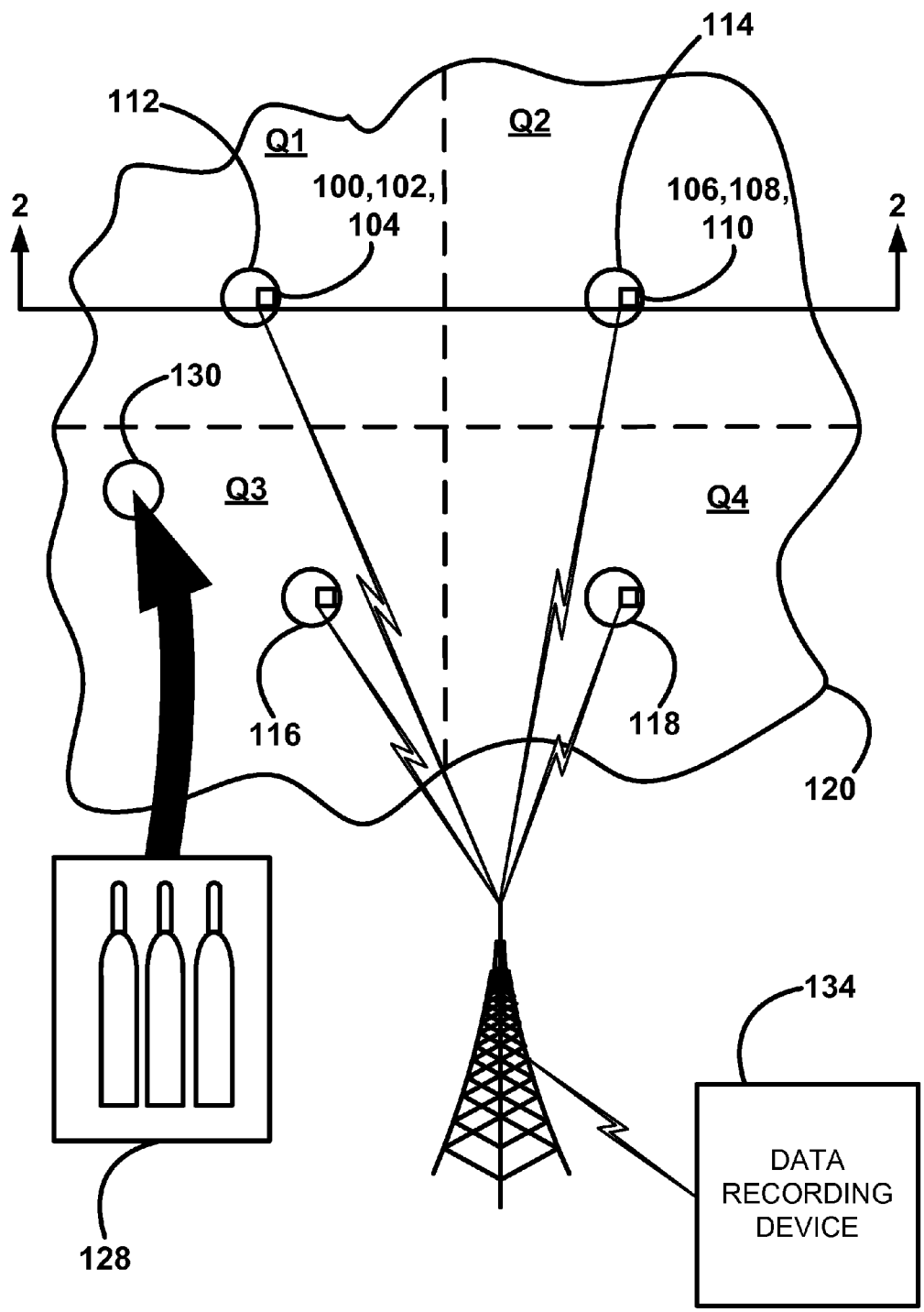
FIG. 1 is a schematic diagram of a method according to some embodiments of the disclosed subject matter.

Generally, the disclosed subject matter relates to methods for long-term gravimetric monitoring of carbon dioxide stored in a geological formation. As represented schematically in FIGS. 1 and 2, methods according to the disclosed subject matter include the placement of gravimetric sensors 100, 102, 104, 106, 108, 110 within and at various vertical depths of boreholes 112, 114, 116, 118 formed in various locations of a geological formation 120. While the principles of the disclosed subject matter are applicable to an arbitrary number of gravimeters, a number <10 is envisioned for monitoring in a typical reservoir for each of boreholes 112-118. Gravimetric sensors are typically relational gravimetric sensors, but can also be gravity gradiometers, and are typically capable of measurements to a precision of 10 μGal or better. In some embodiments, additional sensors such as resistivity sensors, fluid sensors, pressure sensors, temperature sensors, carbon dioxide sensors, and pH sensors can be positioned within boreholes 112-118 adjacent gravimetric sensors 100-110.

In some embodiments, the various vertical depths are selected so that each of the gravimetric sensors is in a different layer of geological formation 120. For example, sensors 100 and 106 are positioned in a layer L1, sensors 102 and 108 are positioned in a layer L2, and sensors 104 and 110 are positioned in a layer L3. In some embodiments, the various locations are distributed across four quadrants Q1-Q4 of geological formation 120. For example, borehole 112 is located in Q1, borehole 114 is located in Q2, borehole 116 is located in Q3, and borehole 118 is located in Q4. Where geological formation 120 covers a large area, multiple installations in adjoining boreholes are envisioned to monitor a large-scale injection of carbon dioxide laterally.

Figure 2:
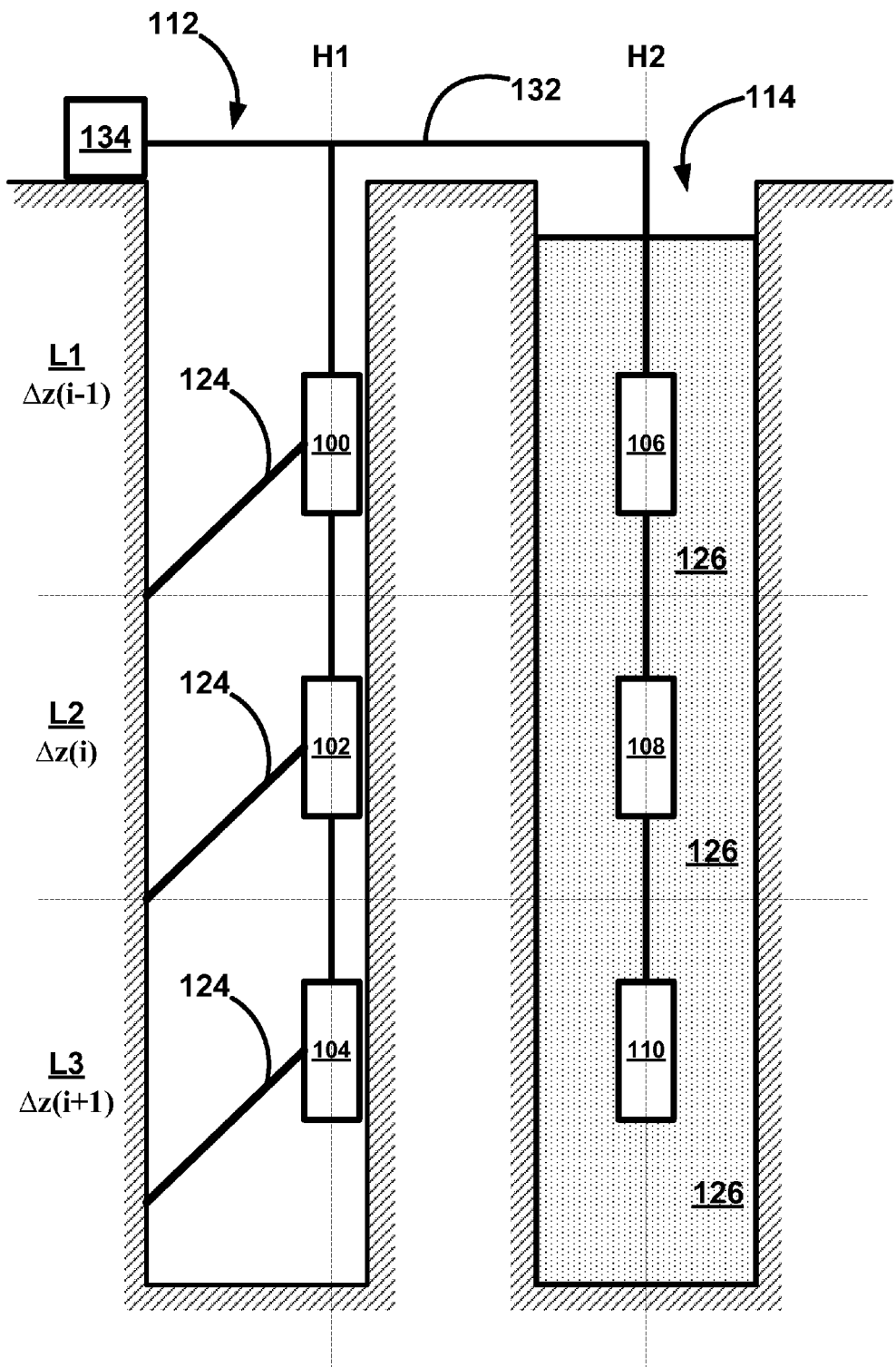
FIG. 2 is a side section view take along line 2-2 of FIG. 1.

As shown in FIG. 2, different configurations can be used to semi-permanently retain gravimetric sensors 100-110 within boreholes 112-118. Gravimetric sensors 100, 102, 104 can be joined with sidewalls 122 of borehole 112 by using clamps 124 to clamp the gravimetric sensors to the sidewalls. Alternatively, gravimetric sensors 106, 108, 110 can be retained within borehole 114 by embedding the gravimetric sensors in cement or packed gravel 126.

Placement of gravimetric sensors 100-110 is made prior to injection of carbon dioxide 128 into geological formation 120 via a separate borehole 130. Gravimetric readings such as a local gravitational field or a gravity gradient are taken using gravimetric sensors 100-110 at a first time prior to the injection of carbon dioxide 128 into geological formation 120 to develop baseline data. The baseline data is transmitted from gravimetric sensors 100-110 either wirelessly as shown in FIG. 1 or via a hard wire 132 as shown in FIG. 2 at predetermined and time-varying sampling periods to a data recording device 134 positioned outside of boreholes 112-118. Baseline data will establish instrument and temperature drift effects for each borehole installation prior to monitoring.

Additional gravimetric readings are taken using gravimetric sensors 100-110 at a second time and other times subsequent to both the first time readings were taken and the injection of carbon dioxide 128 into geological formation 120 to develop post-baseline data. The post-baseline data is transmitted from gravimetric sensors 100-110 to data recording device 134.

Alternatively, gravimetric readings can be taken using gravimetric sensors 100-110 after an occurrence of a predetermined action to develop post-action gravimetric data. Similar to the other data collected, the post-action gravimetric data is transmitted from gravimetric sensors 100-110 to data recording device 134.

Data collected and stored in data recording device 134 can be downloaded periodically or streamed continuously to a web browser. The data collected is analyzed by comparing the baseline gravimetric data to the post-baseline gravimetric data to determine both vertical and horizontal positioning of carbon dioxide 128 stored in geological formation 120. In this way, carbon dioxide 128 stored in geological formation 120 is located and quantified and the vertical and horizontal movement of the carbon dioxide across Q1-Q4 of the geological formation is monitored over time. Vertical position and movement of carbon dioxide 128 is directly detected from data collected by gravimeter sensors positioned in each borehole. Horizontal movement of carbon dioxide 128 is projected from changes in data collected at gravimeter sensors positioned in laterally spaced apart boreholes, e.g., borehole 112 at line H1 and borehole 114 at line H2.

Figure 3:
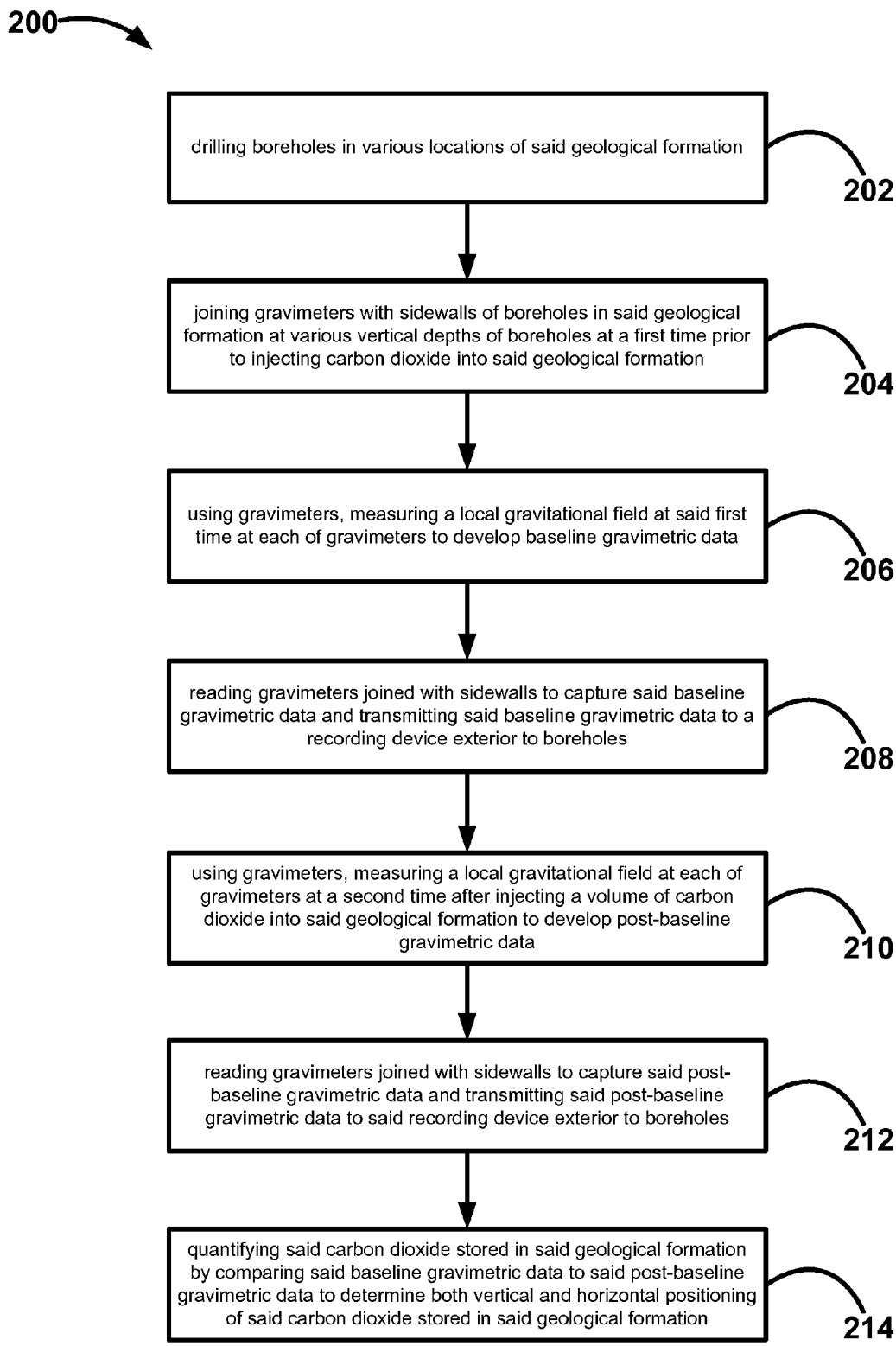
FIG. 3 is a diagram of a method according to some embodiments of the disclosed subject matter.

Referring now to FIG. 3, some embodiments include a method 200 of long-term gravimetric monitoring of carbon dioxide stored in a geological formation. At 202, boreholes are drilled in various locations of the geological formation. At 204, gravimeters are joined with sidewalls of the boreholes in the geological formation at various vertical depths of the boreholes and at a first time prior to injecting carbon dioxide into the geological formation. Typically, the gravimeters are relational gravimeters, but other known types of gravimeters such as absolute gravimeters and other gravimetric sensors such as gravity gradiometers can be used. The gravimeters can be are joined with the sidewalls of the borehole by using clamps to clamp the gravimetric sensors to the sidewalls. Alternatively, the gravimeters can be retained within a borehole by embedding them in cement or packed gravel. At 206, gravimeters are used to measure a local gravitational field at a first time at each of the gravimeters to develop baseline gravimetric data. At 208, the gravimeters are read to capture the baseline gravimetric data and the baseline gravimetric data is transmitted to a data recording device exterior to the boreholes. At 210, gravimeters are used to measure a local gravitational field at each of the gravimeters at a second time after injecting a volume of carbon dioxide into the geological formation to develop post-baseline gravimetric data. Alternatively, gravimetric readings can be taken using the gravimeters after an occurrence of a predetermined action to develop post-action gravimetric data. Similar to the other data collected, the post-action gravimetric data is transmitted from the gravimeters to the data recording device. At 212, the gravimeters are read to capture the post-baseline gravimetric data and the post-baseline gravimetric data is transmitted to the data recording device. At 214, the carbon dioxide stored in the geological formation is quantified by comparing the baseline gravimetric data to the post-baseline gravimetric data to determine both vertical and horizontal positioning of the carbon dioxide stored in the geological formation.

As described above, methods of the disclosed subject matter include placing gravimeters within boreholes at intervals along the depth of a geological reservoir to allow for detection and quantification of relatively small changes in bulk fluid density over time. The density pi of any layer, i, is given by the gravity gradient $\Delta g/\Delta z$ through the layer. The formula for the apparent density may be approximated by $$\rho i = (4\pi G)^{-1} \Delta g / \Delta z^i \qquad \text{[Equation 1]},$$

where G is the Gravitational constant. Because the gradient measured at any point within later i is constant, layers above and below it, i.e., i+1, i−1, etc., have no effect on the gradient within it, i.e., no boundary effects. Also, because liquid carbon dioxide is typically less dense than water, after carbon dioxide injection into a brine-filled geologic reservoir, the carbon dioxide displaces some of the water that fills the pore space and the local fluid density within the reservoir decreases. Thus, gravity changes associated with carbon dioxide injection can be detected between sequential layers, i.e., i, i+1, etc., in a borehole and the mass of in situ carbon dioxide can be quantified. Using gravity gradiometers, changes due to carbon dioxide injection may be detected at each sensor. Note that there are small corrections for latitude and elevation at any site.

The density contrast between the pore water and carbon dioxide depends on temperature, pressure, and salinity. Carbon dioxide injection in fresh water aquifers is unlikely. At shallow depths (<~1000 m), the density contrast is about 500 kg/m$^3$ between seawater (brine) and liquid carbon dioxide. Below this depth, but above ~2500 m, liquid carbon dioxide will be in a supercritical phase and the density difference decreases to ~200 kg/m. Below ~2500 m depth, a density inversion occurs and carbon dioxide becomes slightly heavier then the brine. Regional densities within an aquifer can be calculated with an uncertainty of about 15 kg/m$^3$ or better. Density changes due to carbon dioxide injection will be 40-50 kg/m$^3$, depending on the reservoir porosity and carbon dioxide saturation. Therefore, knowing the depth of the reservoir and its baseline porosity, small density contrasts can be measured.

The gravity signal measured by a gravimeter decreases as $1/r^2$, where r is the distance from the source mass to the instrument. Thus, distance of the source mass from the gravimeter can limit detection and resolution of small density contrasts increases as a gravimeter is placed in close proximity to the injected carbon dioxide. Also, the larger the fluid density contrast, the larger the measured effect is. Thus, carbon dioxide injections near to installed sensors are easiest to detect.

Methods according to the disclosed subject matter provide advantages and benefits over known methods. Downhole gravimeters allow for long-term installation in boreholes to monitor geologic carbon dioxide storage. Gravimeters provide information about the bulk density of the host rock and the fluids present within the open pore space. In combination with other techniques, gravity data will allow for the mapping of bulk density changes over time caused by the injection of carbon dioxide and can be used effectively to quantify the carbon dioxide injection into the subsurface reservoir.

By taking measurements between adjacent holes drilled across a reservoir, gravimetric data can also be used to map lateral changes in bulk density thereby allowing for monitoring the front of the carbon dioxide flood as well as quantifying the stored volume of carbon dioxide.

Few in situ instruments are capable of sustained multi-year deployments in hostile subsurface environments. Methods of installing gravimetric sensors such as gravimeters in boreholes as semi-permanent observatories according to the disclosed subject matter enable detection and quantification of the injected carbon dioxide plume for monitoring purposes over long periods of time.

Methods according to the disclosed subject matter of placing gravimeters within boreholes and not on the land surface or on the seafloor, which positions them in relatively close proximity to the injected carbon dioxide, allows for detection of relatively small changes in bulk density due to the injection in deep geological reservoirs.

Methods according to the disclosed subject matter include the installation of s borehole gravimetric sensors such as gravimeters within boreholes for relatively long periods of time and not lowered and raised as in well logging surveys. As a result, time gaps between measurements are eliminated and continuous monitoring of the injected carbon dioxide is achieved.

In addition to carbon dioxide storage monitoring, the disclosed subject matter can be used for long-term monitoring of gas storage and gas flooding in geological reservoirs.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of long-term gravimetric monitoring of carbon dioxide stored in a geological formation, said method comprising:
    joining gravimetric sensors with sidewalls of boreholes in said geological formation at various vertical depths of said boreholes;
    using said gravimetric sensors, measuring a local gravitational field or a gravity gradient at a first time at each of said gravimetric sensors to develop baseline gravimetric data;
    reading said gravimetric sensors joined with said sidewalls to capture said baseline gravimetric data;
    transmitting said baseline gravimetric data to a data recording device exterior to said boreholes;
    using said gravimetric sensors, measuring a local gravitational field or a gravity gradient at each of said gravimetric sensors after said first time to develop post-baseline gravimetric data;
    reading said gravimetric sensors joined with said sidewalls to capture said post-baseline gravimetric data;
    transmitting said post-baseline gravimetric data to said data recording device exterior to said boreholes; and
    quantifying said carbon dioxide stored in said geological formation by comparing said baseline gravimetric data to said post-baseline gravimetric data to determine both vertical and horizontal positioning of said carbon dioxide stored in said geological formation.

2. The method according to claim 1, wherein said first time is prior to injecting carbon dioxide into said geological formation.

3. The method according to claim 1, wherein said second time is after injecting a volume of carbon dioxide into said geological formation.

4. The method according to claim 1, wherein said gravimetric sensors are relational gravimetric sensors or gravity gradiometers.

5. The method according to claim 1, wherein said gravimetric sensors are joined with said sidewalls by clamping said gravimetric sensors to said sidewalls.

6. The method according to claim 1, wherein said gravimetric sensors are joined with said sidewalls by embedding said gravimetric sensors in cement or packed gravel within said boreholes.

7. The method according to claim 1, further comprising:
    using said gravimetric sensors, measuring a local gravitational field or a gravity gradient at each of said gravimetric sensors after an occurrence of a predetermined action to develop post-action gravimetric data;
    reading said gravimetric sensors joined with said sidewalls to capture said post-action gravimetric data; and
    transmitting said post-action gravimetric data to said data recording device exterior to said boreholes.

8. A method of long-term gravimetric monitoring of carbon dioxide stored in a geological formation, said method comprising:

joining gravimeters with sidewalls of boreholes in said geological formation at various vertical depths of said boreholes at a first time prior to injecting carbon dioxide into said geological formation, said gravimeters not being physically joined with any apparatus exterior to said boreholes after said gravimeters are joined with said sidewalls of said boreholes;

using said gravimeters, measuring a local gravitational field at said first time at each of said gravimeters to develop baseline gravimetric data;

reading said gravimeters joined with said sidewalls to capture said baseline gravimetric data;

transmitting said baseline gravimetric data to a data recording device exterior to said boreholes;

using said gravimeters, measuring a local gravitational field at each of said gravimeters at a second time after injecting a volume of carbon dioxide into said geological formation to develop post-baseline gravimetric data;

reading said gravimeters joined with said sidewalls to capture said post-baseline gravimetric data;

transmitting said post-baseline gravimetric data to said data recording device exterior to said boreholes; and quantifying said carbon dioxide stored in said geological formation by comparing said baseline gravimetric data to said post-baseline gravimetric data to determine both vertical and horizontal positioning of said carbon dioxide stored in said geological formation.

9. The method according to claim 8, wherein said gravimeters are relational gravimeters.

10. The method according to claim 8, wherein said gravimeters are joined with said sidewalls by clamping said gravimeters to said sidewalls.

11. The method according to claim 8, wherein said gravimeters are joined with said sidewalls by embedding said gravimeters in cement or packed gravel within said boreholes.

12. The method according to claim 8, further comprising:
using said gravimeters, measuring a local gravitational field at each of said gravimeters after an occurrence of a predetermined action to develop post-action gravimetric data;

reading said gravimeters joined with said sidewalls to capture said post-action gravimetric data; and transmitting said post-action gravimetric data to said data recording device exterior to said boreholes.

13. A method of long-term gravimetric monitoring of carbon dioxide stored in a geological formation, said method comprising:
drilling boreholes in various locations of said geological formation;

joining gravimeters with sidewalls of said boreholes in said geological formation at various vertical depths of said boreholes;

using said gravimeters, measuring a local gravitational field at a first time at each of said gravimeters to develop baseline gravimetric data;

reading said gravimeters joined with said sidewalls to capture said baseline gravimetric data;

transmitting said baseline gravimetric data to a data recording device exterior to said boreholes;

using said gravimeters, measuring a local gravitational field at each of said gravimeters after said first time to develop post-baseline gravimetric data;

reading said gravimeters joined with said sidewalls to capture said post-baseline gravimetric data;

transmitting said post-baseline gravimetric data to said data recording device exterior to said boreholes; and quantifying said carbon dioxide stored in said geological formation by comparing said baseline gravimetric data to said post-baseline gravimetric data to determine both vertical and horizontal positioning of said carbon dioxide stored in said geological formation.

14. The method according to claim 13, wherein said first time is prior to injecting carbon dioxide into said geological formation.

15. The method according to claim 13, wherein said second time is after injecting a volume of carbon dioxide into said geological formation.

16. The method according to claim 13, wherein said gravimeters are joined with said sidewalls by clamping said gravimeters to said sidewalls.

17. The method according to claim 13, wherein said gravimeters are joined with said sidewalls by embedding said gravimeters in cement or packed gravel within said boreholes.

18. The method according to claim 13, further comprising:
using said gravimeters, measuring a local gravitational field at each of said gravimeters after an occurrence of a predetermined action to develop post-action gravimetric data;

reading said gravimeters joined with said sidewalls to capture said post-action gravimetric data; and transmitting said post-action gravimetric data to said data recording device exterior to said boreholes.

19. The method according to claim 13, wherein said various locations include at least one location in each of four quadrants of said geological formation.

20. The method according to claim 13, wherein quantifying said carbon dioxide stored includes analyzing data captured at each of said gravimeters over time to show vertical and horizontal movement of said carbon dioxide across said geological formation.

* * * * *